United States Patent [19]

Goldman

[11] 3,962,083

[45] June 8, 1976

[54] APPARATUS AND METHOD FOR PROTECTING A SHORELINE AGAINST CONTAMINATION FROM AN OIL SPILL

[75] Inventor: Max Goldman, Latham, N.Y.

[73] Assignee: RRC International, Inc., Latham, N.Y.

[22] Filed: Feb. 27, 1975

[21] Appl. No.: 553,592

Related U.S. Application Data

[63] Continuation of Ser. No. 417,478, Nov. 19, 1973, abandoned.

[52] U.S. Cl. .............................. 210/79; 210/242 AS; 210/DIG. 26
[51] Int. Cl.² ..................... B01D 41/02; C02B 9/02; E02B 15/04
[58] Field of Search ........ 210/40, 79, 242, DIG. 21; 61/38

[56] References Cited
UNITED STATES PATENTS

| 3,657,125 | 4/1972 | Strickman | 210/40 |
| 3,679,058 | 7/1972 | Smith | 210/242 |
| 3,696,623 | 10/1972 | Heine et al. | 61/38 |

FOREIGN PATENTS OR APPLICATIONS

| 735,254 | 5/1966 | Canada | 210/DIG. 21 |

Primary Examiner—Charles N. Hart
Assistant Examiner—Ferris H. Lander
Attorney, Agent, or Firm—Joseph P. Gastel

[57] ABSTRACT

Apparatus for treating a shoreline against contamination from an oil spill on adjacent waters comprising a first vehicle for laying down a web of oil absorbing material on said shoreline and taking up said web after it has absorbed oil, a second vehicle for transporting said first vehicle and said webs to the area of said shoreline, and a third vehicle for storing oil extracted from said web by extraction mechanism on said first vehicle. An all-terrain vehicle for laying a web of oil absorbing material on a shoreline including a vehicle body supported by a plurality of wheels, means on said body for supporting a coiled web of said oil absorbing material and for guiding said web onto said shoreline, and means for coiling said web back onto the vehicle and extracting oil therefrom. A method of treating a shoreline against contamination from an oil spill comprising the steps of transporting a web laying vehicle and a plurality of oil absorbing webs to said shoreline, causing said web laying vehicle to lay said oil absorbing webs onto said shoreline, taking up said oil absorbing webs and extracting oil from them, and conveying said extracted oil away from said shoreline. A web for use in absorbing oil deposited on a shoreline including spaced layers of plastic netting confining shredded polyolefin fibers therebetween.

24 Claims, 9 Drawing Figures

U.S. Patent June 8, 1976 Sheet 1 of 3 3,962,083
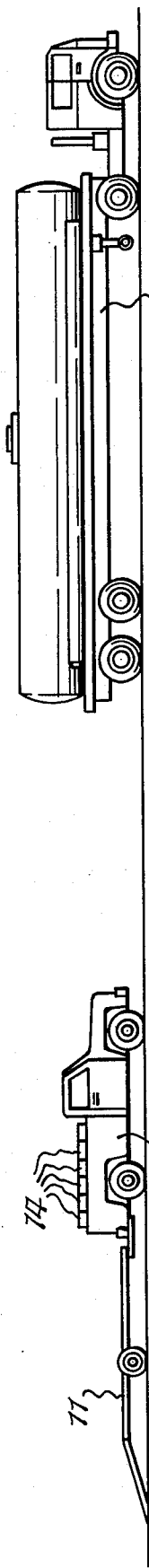
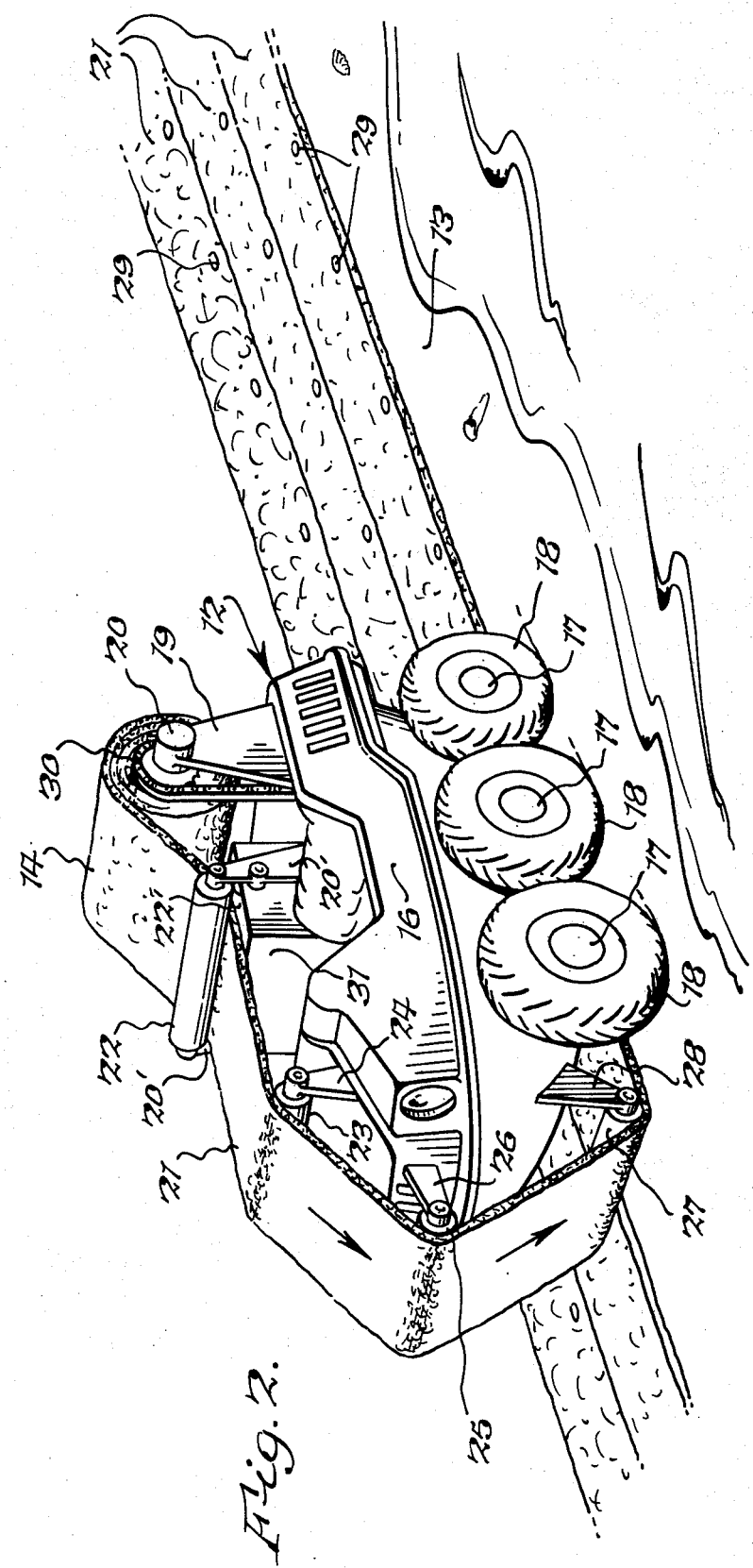

U.S. Patent June 8, 1976 Sheet 3 of 3 3,962,083
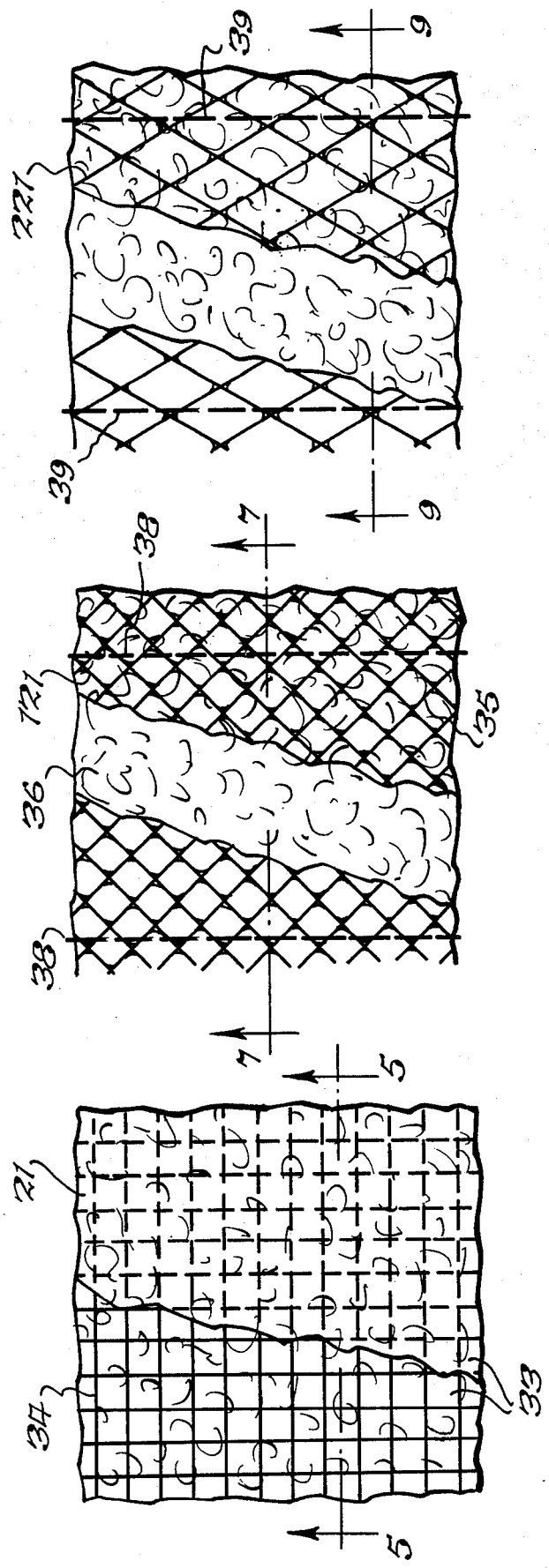
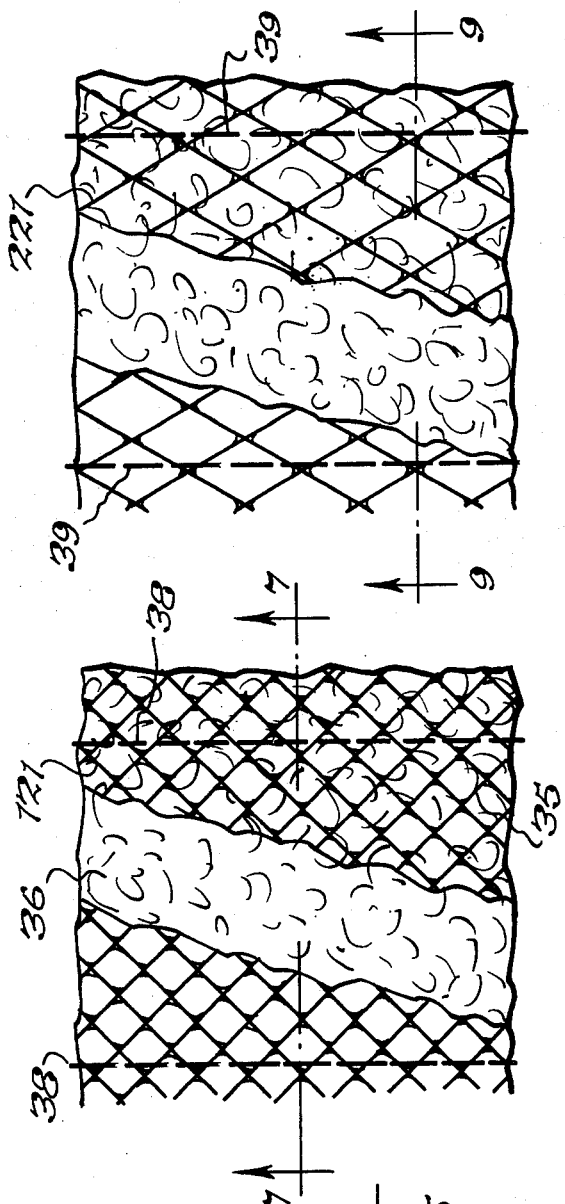
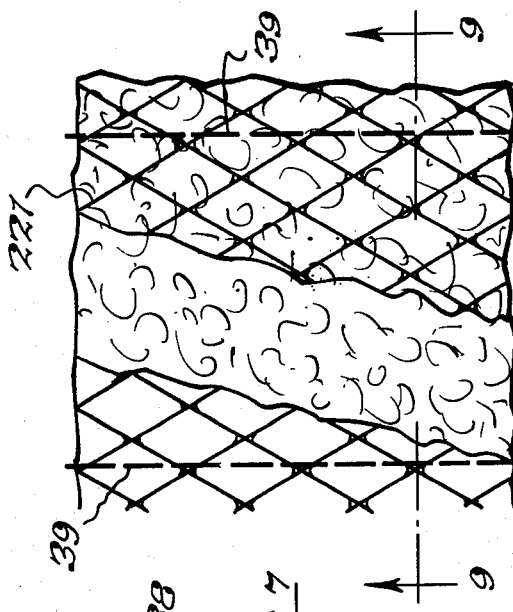
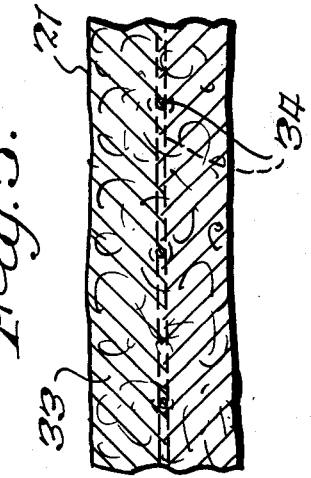
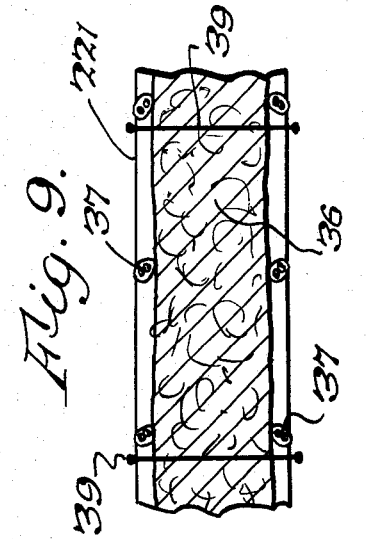
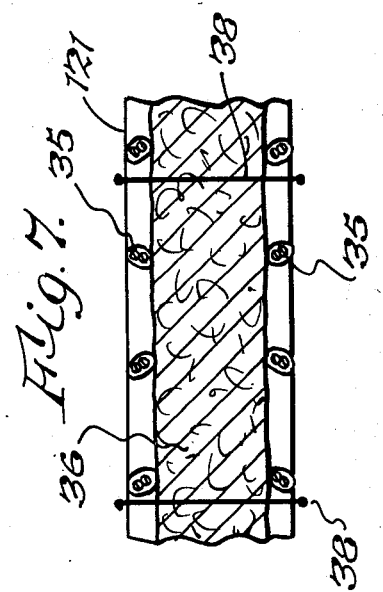

APPARATUS AND METHOD FOR PROTECTING A SHORELINE AGAINST CONTAMINATION FROM AN OIL SPILL

This is a continuation, of application Ser. No. 417,478 filed on Nov. 19, 1973, and now abandoned.

The present invention relates to an improved method and apparatus for protecting a shoreline from contamination due to an oil spill on adjacent waters.

By way of background, the cleaning-up of shorelines contaminated by oil spills on adjacent waters has been extremely difficult because the usual procedure was to spread loose oil absorbing material on the beach at random and thereafter pick it up for disposal. This was an inefficient procedure, considering that it was extremely difficult to pick up all of the oil-absorbing material. It is with overcoming the foregoing deficiency of the prior art that the present invention is concerned.

It is accordingly one important object of the present invention to provide improved apparatus for laying a protective oil absorbing blanket onto the shoreline in an orderly organized manner, preferably in anticipation of the arrival of an oil spill, and thereafter picking up the blanket and extracting oil therefrom.

Another object of the present invention is to provide an improved web-laying vehicle for laying a web of oil-absorbing material onto a shoreline and lifting the web therefrom.

A further object of the present invention is to provide an improved method of protecting a shoreline from contamination due to the deposit of an oil spill on adjacent waters.

A still further object of the present invention is to provide an improved oil-absorbing web which can be laid onto a shoreline or the like to absorb oil deposited thereon. Other objects and attendant advantages of the present invention will be readily perceived hereafter.

Broadly, the improved apparatus for treating a shoreline against contamination from an oil spill on adjacent waters comprises first vehicle means for laying down web means of oil-absorbing material on said shoreline, second vehicle means for transporting said first vehicle means and said web means to the area of said shoreline, and take-up means for taking up said web means from said shoreline. The take-up means is preferably mounted on said first vehicle means which also lays down the web means. The first vehicle means also preferably includes oil extracting means for extracting oil from said web means. The apparatus also includes storage means in the nature of a tanker vehicle for storing oil extracted from said web means.

The present invention also relates to a vehicle for laying a web of oil absorbing material on a shoreline comprising a vehicle body, a plurality of wheels on said body, means on said body for supporting a coiled web of said oil absorbing material, and means on said body for guiding said web onto the shoreline as the vehicle traverses the shoreline. Preferably the vehicle also includes loading means for loading the web back onto the vehicle and oil extracting means for extracting oil from said web.

The improved method of treating a shoreline against contamination from an oil spill comprises the steps of transporting a web laying vehicle and a plurality of oil absorbing webs to the shoreline, causing the web laying vehicle to lay said oil absorbing web onto said shoreline, taking up said oil absorbing webs after they have been exposed to oil, extracting oil from said webs, storing said extracted oil, and conveying said extracted oil away from said shoreline.

The improved web of the present invention comprises spaced layers of plastic netting confining shredded polyolefin fibers therebetween.

The various aspects of the present invention will be more fully understood when the following portions of the specification are read in conjunction with the accompanying drawings wherein:

FIG. 1 is a side elevational view of the vehicle which is used to transport the web laying vehicle to the shoreline along with extra coiled webs for use thereby and also showing an oil tanker for receiving oil which is extracted from webs which are taken up from the shoreline;

FIG. 2 is a fragmentary perspective view showing the web laying vehicle laying the web along the shoreline;

FIG. 4 is a fragmentary plan view of one type of oil absorbing web which may be used on the vehicle of FIGS. 2 and 3;

FIG. 5 is a fragmentary cross sectional view taken substantially along line 5—5 of FIG. 4;

FIG. 6 is a fragmentary plan view of another type of oil absorbing web which may be used on the vehicle of FIGS. 2 and 3;

FIG. 7 is a fragmentary cross sectional view taken substantially along line 7—7 of FIG. 6;

FIG. 8 is a fragmentary plan view of a still further type of oil absorbing web which may be used in conjunction with the vehicle of FIG. 2; and FIG. 9 is a fragmentary cross sectional view taken substantially along line 9—9 of FIG. 8.

Figure 3:
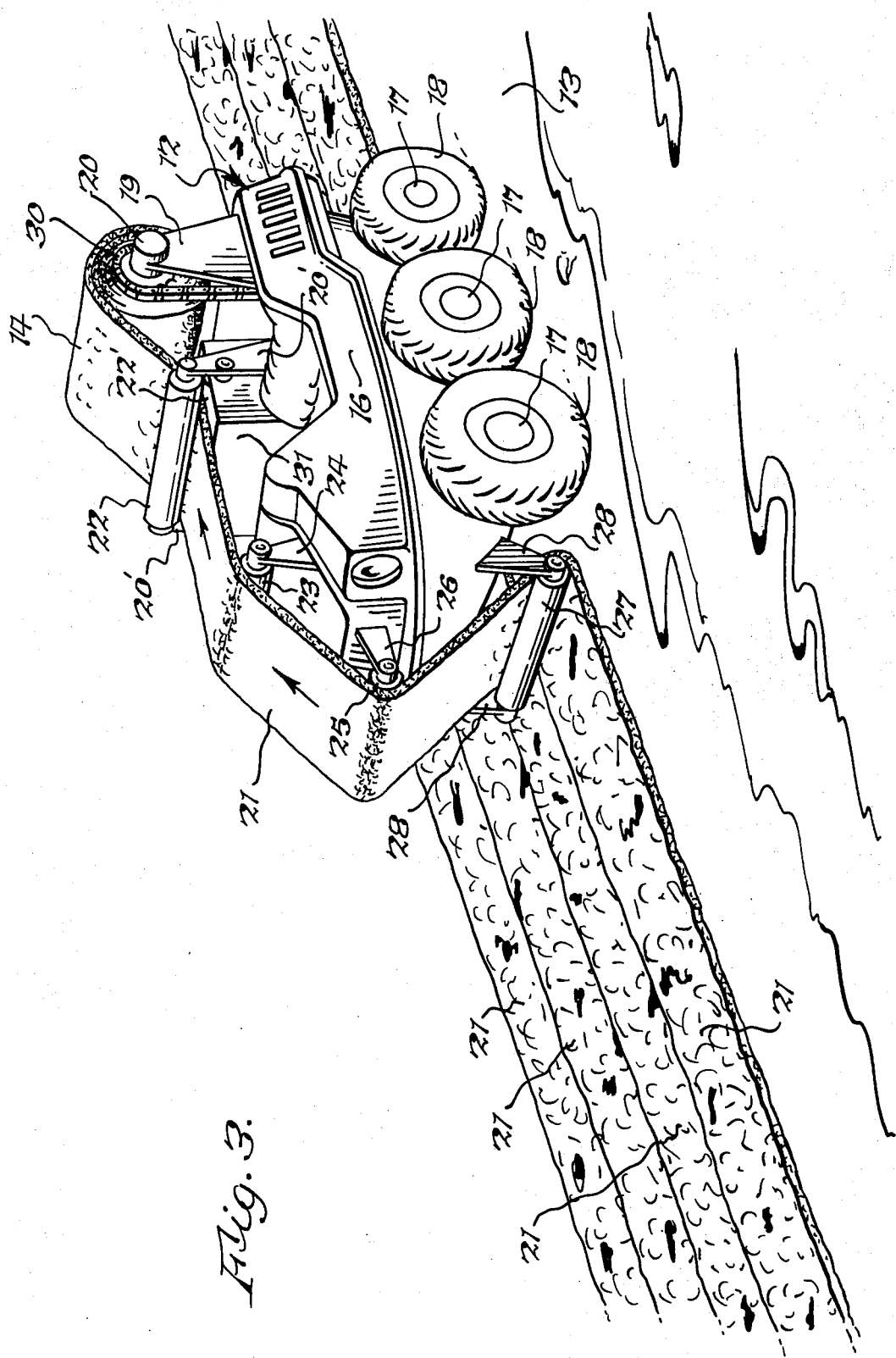
FIG. 3 is a fragmentary perspective view showing the web laying vehicle taking up the web from the shoreline.

As mentioned briefly above, the apparatus and method of the present invention is for the purpose of protecting shorelines from contamination due to the deposit of oil from an oil spill on adjacent waters. The apparatus consists broadly of a transporting vehicle 10 in the nature of a truck which hauls trailer 11 which mounts a web laying vehicle 12 for transportation to the shoreline 13 which is the site of the anticipated contamination. The vehicle 10, in addition to hauling trailer 11, also carries a large number of coils 14 of oil absorbing webs which are to be utilized by web laying vehicle 12. In addition, the apparatus includes an oil tanker 15 for receiving oil which has been extracted from webs 14 and for transporting such oil to a suitable disposal area.

The web laying vehicle 12 includes a body 16 which is watertight and which is mounted on six wheels 17 having relatively soft tires 18 thereon. This vehicle can travel on the type of terrain which is associated with a shoreline, namely, terrain which includes sand, marshes, woodlands, hills and the like. In other words, it is an all-terrain vehicle which is amphibious. Toward the rear of body 16 are mounted a pair of spaced brackets 19 which support a selectively removable shaft 20 on which coil 14 is mounted. A suitable braking mechanism (not shown) is associated with shaft 20 to provide a resistance as web 21 is uncoiled therefrom. This braking mechanism may have an adjustment thereon so that the braking force can be adjusted as required for various conditions. The portion of web 21 being uncoiled passes under first guide roller 22 mounted on spaced brackets 20', over second guide roller 23 which is mounted on a pair of spaced brackets 24, over a third guide roller 25 which is mounted on the front of the vehicle by a pair of spaced brackets 26 and under a fourth guide roller 27 which is mounted on a pair of spaced brackets 28 located at the front of the vehicle and proximate the ground. Additional rollers, such as 27, may be mounted underneath the vehicle to guide the web being uncoiled. If desired, the various rollers may have flanges at their outer ends to prevent the web from sliding laterally off of the rollers and under tires 18. While only one of each of the pairs of brackets such as 19, 24, 26 and 28 have been shown, it will be appreciated that the other bracket of each pair is a mirror image counterpart of the one which is shown.

Since webs 21 are much narrower than the width of the shoreline being protected, a plurality of adjacent webs 21 will have to be laid on the shoreline, as shown in FIGS. 2 and 3. Preferably the webs 21 are laid in a shingled orientation with the webs which are most remote from the water being laid first and the remaining webs being laid in overlapping relationship relative to each other so that waves coming up onto the shoreline will not tend to flow under the leading edges of the webs. Furthermore, the overlapping relationship of the webs tends to provide practically complete coverage on level ground without any spaces therebetween. Stakes 29 may be driven through the edges of webs 21 to firmly anchor them to the ground. These stakes may be driven manually or if desired a stake driving attachment may be incorporated into vehicle 12 so that the stakes are driven automatically.

As noted briefly above, the webs 21 are laid on the shoreline in anticipation to the arrival of waterborne oil. Essentially therefore webs 21 provide a protective blanket. After the oil spill has terminated its depository action on the webs 21, the webs are taken up from the shoreline 13 by essentially reversing the laying procedure described above. First of all, the stakes 29, if used, are extracted, either manually, or by an independent stake pulling vehicle, or by a suitable attachment (not shown) mounted on web laying vehicle 12. The web is then coiled onto shaft 20 which is driven in a clockwise direction in FIG. 3 by means of a suitable drive chain 30 driven from a suitable power takeoff (not shown) on the vehicle. The web 21 being wound onto shaft 20 initially passes under roller 27, over roller 25, over roller 23, and between rollers 22 and 22', which have their opposite ends journalled in spaced brackets 20'. Rollers 22—22' extract oil from web 21, and this extracted oil drops into tank 31 which is mounted on the vehicle. A suitable adjustment (not shown) may be provided to vary the spacing between rollers 22—22', as required. Periodically tank 31 is emptied into tanker vehicle 15 by a suitable pump (not shown) or the like. The coil 14, after being fully wound, is removed from shaft 20 and remounted on vehicle 10.

The oil absorbing web 21 may be fabricated in any number of different ways and from any number of different types of materials. For example, the web shown in FIGS. 4 and 5 comprises two layers of cellulosic fibers 33 supported on an intermediate scrim 34 to which they are suitably secured. Absorbing web 121 of FIGS. 6 and 7 may consist of two layers of relatively heavy molded plastic netting 35 confining shredded polyolefin such as polyurethane, polypropylene or polyethylene 36 therebetween, with the plastic netting being stitched together with rows of suitable stitching 38 running longitudinally of the web. Alternatively, web 221 may consist of two spaced layers of relatively light woven plastic netting 37 confining the shredded polyolefin fibers noted above therebetween, with the plastic netting being stitched together by rows 39 of stitching which run longitudinally of the web. The polyolefin fibers used in the various embodiments may be up to about 4 inches long and between 0.5 and 1.0 mils in diameter, and the webs may be between 1/16 and 3/8 inches thick and about 3 feet wide. Of course, the width of the web can vary, depending on the width of the vehicle and the manner in which the web is supported thereon. It will be appreciated that the webs must have the required strength to withstand the handling incurred during the laying and taking up of the webs by the vehicle 12. The webs must be sufficiently strong so that they can withstand numerous cycles of use. Furthermore, the webs must have sufficient flexibility so that they can be coiled and also they must be sufficiently flexible so that they will conform in a satisfactory manner to the unevenness of the ground on which they are laid.

It can thus be seen that the improved apparatus and method of the present invention is manifestly capable of achieving the above enumerated objects and while preferred embodiments have been disclosed, it will be appreciated that the present invention is not limited thereto but may be otherwise embodied within the scope of the following claims.

What is claimed is:

1. A method of treating a shoreline against contamination from an oil spill comprising the steps of transporting a web-laying vehicle and oil-absorbing web means to said shoreline, causing said web-laying vehicle to lay said oil-absorbing web means onto said shoreline as a blanket, taking up said oil-absorbing web means after they have been exposed to oil, extracting oil from said web means, storing said extracted oil, and conveying said extracted oil away from said shoreline.

2. A method as set forth in claim 1 wherein said web means comprise a plurality of oil-absorbing webs.

3. A method as set forth in claim 1 wherein said oil-absorbing web means are laid on said shoreline in anticipation of oil being deposited thereon.

4. A method of treating a shoreline against contamination from an oil spill comprising the steps of providing a web-laying vehicle and oil-absorbing web means, causing said web-laying vehicle to lay said oil-absorbing web means on said shoreline as a blanket, and taking up said oil-absorbing web means after they have been exposed to oil.

5. A method as set forth in claim 4 wherein said oil-absorbing web means are laid in a series of overlapping strips.

6. A method as set forth in claim 5 including the step of staking said web means to the ground.

7. A method as set forth in claim 4 including the step of laying said oil-absorbing web means on said shoreline in anticipation of oil being deposited thereon.

8. A method as set forth in claim 7 wherein said oil-absorbing web means are laid in a series of overlapping strips.

9. A method as set forth in claim 8 including the step of staking said web means to the ground.

10. A method of treating a shoreline against contamination from an oil spill comprising the steps of transporting oil-absorbing web means to a shoreline, laying said oil-absorbing web means on said shoreline as a blanket, and taking up said oil-absorbing web means after they have been exposed to oil.

11. A method as set forth in claim 10 wherein said oil-absorbing web means are laid in a series of overlapping strips.

12. A method as set forth in claim 10 including the step of anchoring said web means to the ground.

13. A method as set forth in claim 10 including the step of laying said oil-absorbing web means on said shoreline in anticipation of oil being deposited thereon.

14. A method as set forth in claim 13 wherein said oil-absorbing web means are laid in a series of overlapping strips.

15. A method as set forth in claim 14 including the step of anchoring said web means to the ground.

16. A method as set forth in claim 10 wherein said oil-absorbing web means are laid in a series of adjacent strips.

17. A method as set forth in claim 10 including the step of extracting oil from said web means, and conveying said extracted oil away from said shoreline.

18. A method as set forth in claim 17 including the step of storing said extracted oil before conveying said oil away from said shoreline.

19. A method as set forth in claim 17 wherein said oil-absorbing web means are laid in a series of overlapping strips.

20. A method as set forth in claim 17 wherein said oil-absorbing web means are laid in a series of adjacent strips.

21. A method as set forth in claim 20 including the step of anchoring said web means to the ground.

22. A method as set forth in claim 21 including the step of laying said oil-absorbing web means on said shoreline in anticipation of oil being deposited thereon.

23. A method as set forth in claim 22 wherein said oil-absorbing web means are laid in a series of overlapping strips.

24. A method as set forth in claim 10 including the step of using a vehicle for the taking up of said oil-absorbing web means.

* * * * *